(12) United States Patent
Dupuis et al.

(10) Patent No.: US 6,681,464 B1
(45) Date of Patent: Jan. 27, 2004

(54) TOOLING APPARATUS

(75) Inventors: Christian Dupuis, Cincinnati, OH (US); Robert Allan Ahti, Hillsborough, NH (US); Larisa Alexandra Elman, Swampscott, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/370,868

(22) Filed: Feb. 20, 2003

Related U.S. Application Data

(60) Provisional application No. 60/437,497, filed on Dec. 30, 2002, provisional application No. 60/437,238, filed on Dec. 30, 2002, and provisional application No. 60/437,236, filed on Dec. 30, 2002.

(51) Int. Cl.[7] .............................................. B25B 27/14
(52) U.S. Cl. ........................ 29/281.1; 269/88; 269/282
(58) Field of Search ........................... 29/281.1; 269/99, 269/93, 94, 88, 303–306, 315–319, 48.1, 297–301, 291, 10, 282, 900, 902; 411/84, 104

(56) References Cited

U.S. PATENT DOCUMENTS

| | | |
|---|---|---|
| 2,422,773 A | 6/1947 | Colwill |
| 2,995,962 A | 8/1961 | Dietz |
| 3,681,834 A | 8/1972 | Seidenfaden |
| 3,712,606 A * | 1/1973 | Cole ............. 269/92 |
| 3,766,046 A | 10/1973 | Flint |
| 3,824,744 A | 7/1974 | Petrant |
| 4,302,144 A | 11/1981 | Ilallqvist |
| 4,340,211 A * | 7/1982 | Chiappetti ............. 269/110 |
| 4,382,215 A | 5/1983 | Barlow et al. |
| 4,445,678 A * | 5/1984 | George ............. 269/88 |
| 4,540,164 A | 9/1985 | Shade, Jr. |
| 4,669,227 A | 6/1987 | Treppner |
| 4,735,404 A | 4/1988 | Blumle |
| 4,765,531 A | 8/1988 | Ricketson et al. |
| 4,790,695 A | 12/1988 | Abernethy |
| 4,829,720 A | 5/1989 | Cavalieri |
| 4,834,358 A | 5/1989 | Okolischan et al. |
| 5,174,715 A | 12/1992 | Martin |
| 5,493,762 A | 2/1996 | Abdiou et al. |
| 5,497,980 A | 3/1996 | Chick |
| 5,516,086 A | 5/1996 | Tankersley |
| 5,667,209 A | 9/1997 | Lenzkes |
| 5,676,359 A | 10/1997 | Feltrin |

(List continued on next page.)

OTHER PUBLICATIONS

U.S. patent application Ser. No. 10/370,960 Ahti et al., filed Feb. 20, 2003.
U.S. patent application Ser. No. 10/370,869 Elman et al., filed Feb. 20, 2003.

Primary Examiner—George Nguyen
Assistant Examiner—Daniel Shanley
(74) Attorney, Agent, or Firm—V. G. Ramaswamy; Hasse Guttag & Nesbitt LLC; Daniel F. Nesbitt

(57) ABSTRACT

A modular tooling apparatus for performing a metalworking operation on a workpiece, having a base comprising an attachment surface having a locating feature, a removable insert separably secured to the attachment surface, having a locating feature and a workpiece support feature on a surface thereof, and an extraction/locking device movable between a first position wherein the insert is secured to the attachment surface, whereby the locating feature of the insert associates with the locating feature of the attachment surface, and a second position wherein the insert is at least partially extracted from the attachment surface. The extraction/locking device alternately secures an insert to the base and assists in extracting the insert from the base. The device provides for ease of removal of an insert when the upper portion does not provide convenient surfaces for a technician to grab.

14 Claims, 10 Drawing Sheets

U.S. PATENT DOCUMENTS

| | | |
|---|---|---|
| 5,869,194 A | 2/1999 | Dwyer |
| 5,941,513 A | 8/1999 | Moilanen et al. |
| 6,000,688 A | 12/1999 | Giangrasso |
| 6,032,348 A | 3/2000 | Haas et al. |
| 6,062,553 A | 5/2000 | Strehl |
| 6,068,541 A | 5/2000 | Dwyer |
| 6,139,412 A | 10/2000 | Dwyer |
| 6,158,728 A * | 12/2000 | Smith .......................... 269/99 |
| 6,161,825 A | 12/2000 | Webster et al. |
| 6,179,279 B1 | 1/2001 | Asai et al. |
| 6,272,956 B1 | 8/2001 | Schuettel |
| 6,273,408 B1 | 8/2001 | Moilanen et al. |
| 6,364,302 B2 | 4/2002 | Ausilio |
| 6,435,497 B1 | 8/2002 | Borter |
| 6,490,899 B2 | 12/2002 | Berthelet et al. |

* cited by examiner

TOOLING APPARATUS

This application claims benefit of PROVISIONAL APPLICATION Ser. No. 60/437,497 filed Dec. 30, 2002, and claims benefit of No. 60/437,238 filed Dec. 30, 2002, and claims benefit of No. 60,437,236 filed Dec. 30, 2002.

FIELD OF THE INVENTION

The invention relates to the field of tooling and tooling systems for metalworking operations.

BACKGROUND OF THE INVENTION

The development of metalworking machines was one of the key factors in the Industrial Revolution that began around the turn of the nineteenth century. This was a class of machine that could make almost anything, including reproducing itself. Researchers in manufacturing processes soon realized that more efficient metalworking machines would reduce the manufacturing cost of whatever products were being made. Thus, great effort was devoted toward understand the various metalworking processes, to increase metal cutting rates, and the like. Better cutting tools were developed. More powerful metalworking machines were developed. Manufacturing engineers came to realize that the most efficient metal cutting operations were those in which the cutting tools were worn out in a surprisingly short time; cutting tools became expendable items in the costs of a manufacturing operation.

As a result of the considerable research devoted to metal cutting operations, the time required for such operations was steadily reduced. While further efforts in this direction will undoubtedly reduce manufacturing time, one must ponder whether the point of diminishing returns has been reached. Researchers in manufacturing engineering began to address this matter many years ago. One researcher found that metal cutting accounted for less than 20% of the time that a part spent in a manufacturing plant. Most of the remaining time was spent awaiting the next manufacturing operation. This realization led to development of dedicated tooling that would be used for the manufacture of just one type of part, but with a reduced time for changing workpieces. It also led to more sophisticated plant layouts, so that the parts flowed through a factory in a logical fashion. Cellular manufacturing was developed. Under this concept, several different manufacturing machines, together with necessary accessory equipment, were clustered in one area of a factory. Thus, a batch of parts could go from incoming raw material to virtually complete parts with few, if any, excursions where manufacturing operations were performed. Time required for shipping a batch of parts around the plant was significantly reduced. Time spent trying to find parts that had been lost during intra-factory shipment was also reduced.

Managers of manufacturing enterprises began to keep track of work in progress, and to recognize the substantial investment that work in progress represents. Such efforts led to decreasing the size of components kept in inventory for subsequent assembly, and to decreasing the inventories of finished products awaiting shipment. The favored size for batches of parts became smaller. While such trends represent reduction in overall costs of manufacturing, such trends also placed pressure on manufacturing operations to change tooling between different manufacturing processes more quickly. The combination of smaller batch size and more widespread use of manufacturing cells has accentuated the need for reducing the time required for changeover of tooling.

Metalworking frequently involves precision machining of workpieces, often within tolerances of a few mils. (One mil is 0.001 inch, or 25 micrometers.) One of the essential prerequisites of precision machining is rigid support of the workpiece. In conventional metalworking practice, dedicated tooling to hold a particular workpiece for the metalworking operation is provided. Such dedicated tooling must provide rigid support for the workpiece.

A metalworking operation can involve the machining of families of workpieces of the same general, proportional shape, but different in size and dimensions. Typically, a family of dedicated holding devices is required for a family of workpiece members. While some parts in a workpiece family can be very small, and the associated dedicated tooling can be manipulated and carried by hand, other workpieces and their dedicated tooling can be much larger, requiring mechanical assistance (e.g., a crane) to lift, carry and position the dedicated tooling devices.

Dedicated tooling is designed to hold one workpiece family member in a precise location and position for the metalworking operation. The alignment of the dedicated tooling and the workpiece it holds to the metalworking machine must be exact, and often requires significant setup time to ensure proper alignment with the metalworking machine. Achieving such alignment is a trial-and-error process, generally requiring repeated steps of tapping the tooling to move it a small distance, tightening the bolts used to secure it in place, and then checking the alignment using dial indicators or the like. The critical nature of this process typically requires attention by the most highly skilled workers in the manufacturing facility. Often, trial parts of the workpiece must be test worked, with minute adjustments of the dedicated tooling to the worktable, to ensure the metalworking operation machines the workpiece properly.

When a metalworking facility needs to machine a variety of members of a workpiece family, there can be significant amounts of production time lost in tooling changeover, in disassembling tooling used on the first workpiece, retrieving the dedicated tooling for the next workpiece, and then installing and aligning the retrieved dedicated tooling, etc. Changing the tooling from that required for one workpiece to that required for another similar workpiece is frequently a major factor in the cost for operating a metalworking facility, particularly when business conditions in the industry can necessitate small production lot sizes.

In addition, to machine a family of workpieces that are similar in size but different in detail, equivalent families of dedicated tooling must be manufactured. Because each set of dedicated tooling must accept and secure the workpiece in generally two or more places for proper positioning and alignment, these dedicated tools can be complex and expensive.

Considerable savings in manufacturing costs can be achieved by simplifying the tool changeover process. The present invention addresses several aspects of this need, and provides tooling amenable to rapid changeover, as used in many types of metalworking operations.

The issues discussed hereinabove are well known to those skilled in the metalworking arts and in manufacturing engineering, and are described in Manufacturing Engineering and Technology (Fourth Edition), by Serope Kalpakjian and Steven R. Schmid.

BRIEF DESCRIPTION OF THE INVENTION

An embodiment of the invention provides a modular tooling apparatus for performing a metalworking operation on a workpiece, comprising: a base comprising an attachment surface comprising a locating feature; a removable insert associated with the attachment surface, the insert comprising a locating feature and a workpiece support feature on a surface thereof; and an extraction/locking device comprising a first configuration wherein the insert is secured to the attachment surface, whereby the locating feature of the insert associates with the locating feature of the attachment surface to define a location of the workpiece support feature relative to the base, and a second configuration wherein the insert is at least partially extracted from the attachment surface.

DETAILED DESCRIPTION OF THE INVENTION

Definitions

Figure 1:
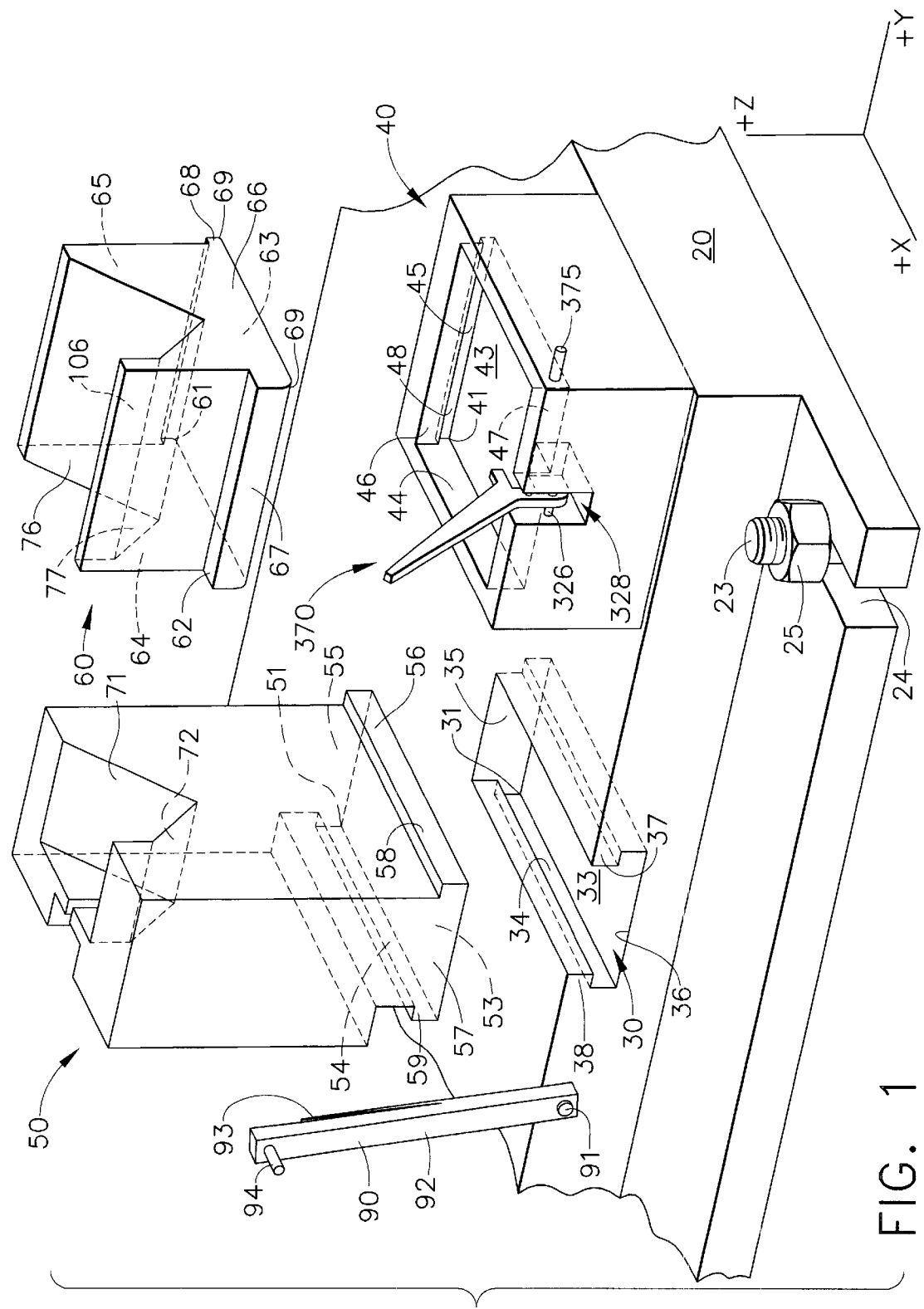
FIG. 1 shows a schematic representation of an modular tooling apparatus for machining a workpiece, illustrating a base, a first tooling insert for associating with a first pocket, a second tooling insert for associating with a second pocket, and an extraction/locking device incorporated associated with the second pocket.

As used herein, the phrase "metalworking machine" refers to any machine for the cutting, forming, joining or otherwise processing of a metallic workpiece. The term can include, but is not limited to, a milling machine, a planer, a shaper, a drill press, a vertical turret lathe, a grinder, EDM and ECM machines, a broaching machine, a bending brake, a stamping press, and a welding apparatus. In a broad context, the term can also include such diverse forms of equipment as a lathe or a die casting machine.

As used herein, the term "tooling" refers to an apparatus for holding and supporting a workpiece while it is being cut, formed, joined or otherwise processed by a metalworking machine.

As used herein, the term "tool" refers to an apparatus used by a metalworking machine to cut, form, join or otherwise process a workpiece.

As used herein, a "set" of inserts is a plurality of inserts configured to cooperatively support a single workpiece in a modular tooling apparatus. Generally, there is a set of pockets on a base that corresponds with the set of inserts.

As used herein, a "family" is a plurality of related members. A "family" of workpieces is a plurality of workpieces that has substantially the same shape and features, though the workpieces are different in size or proportion, and are thus related but different in detail. A "family" of inserts is a plurality of inserts, or of sets of inserts, configured to hold or support members of a corresponding family of workpieces that are related but different in detail.

As used herein, "corresponding" or a similar word refers to insert A associating with and fitting into pocket A, insert B into pocket B, etc. The term can also refer to insert A associating and supporting workpiece A, insert B associating and supporting workpiece B, etc.

As used herein, a "locating feature" is a surface or a combination of surfaces on an element configured to ensure positive positioning and/or orientation at a location with respect to the base, and with respect to the metalworking operation, with a high degree of accuracy and repeatability.

As used herein, a "location" of a workpiece support feature is a precise position (in x, y and z space) and orientation (relative to x, y, and z axes) relative to the base. A "location" of a workpiece that is being held in position by one or more workpiece support features is its corresponding precise position (in x, y and z space) and orientation (relative to x, y, and z axes) relative to the metalworking operation.

As used herein, the term "chips" includes all forms of debris generated in a metalworking operation, including, but not limited to, chips, grinding swarf, metal particles formed in EDM, ECM and laser cutting operations, weld spatter and flux particles, and the like.

The present invention provides an improvement in metalworking tooling used to support metal workpieces in a metalworking operation. The base has at least one attachment surface to which at least one insert can associate. Typically, the insert associates with the attachment surface by a mechanical engagement that at least partially and temporarily secures the insert to the base. Several embodiments of mechanical engagement are disclosed herein. An extraction/locking device of the present invention secures an insert to the attachment surface. The extraction/locking device typically is movable between a first configuration wherein the insert is secured to the attachment surface, and a second configuration wherein the insert is at least partially extracted from the attachment surface. The extraction/locking device provides for ease of removal of an insert when the upper portion does not provide convenient surfaces for a technician to grab manually.

Figure 2:
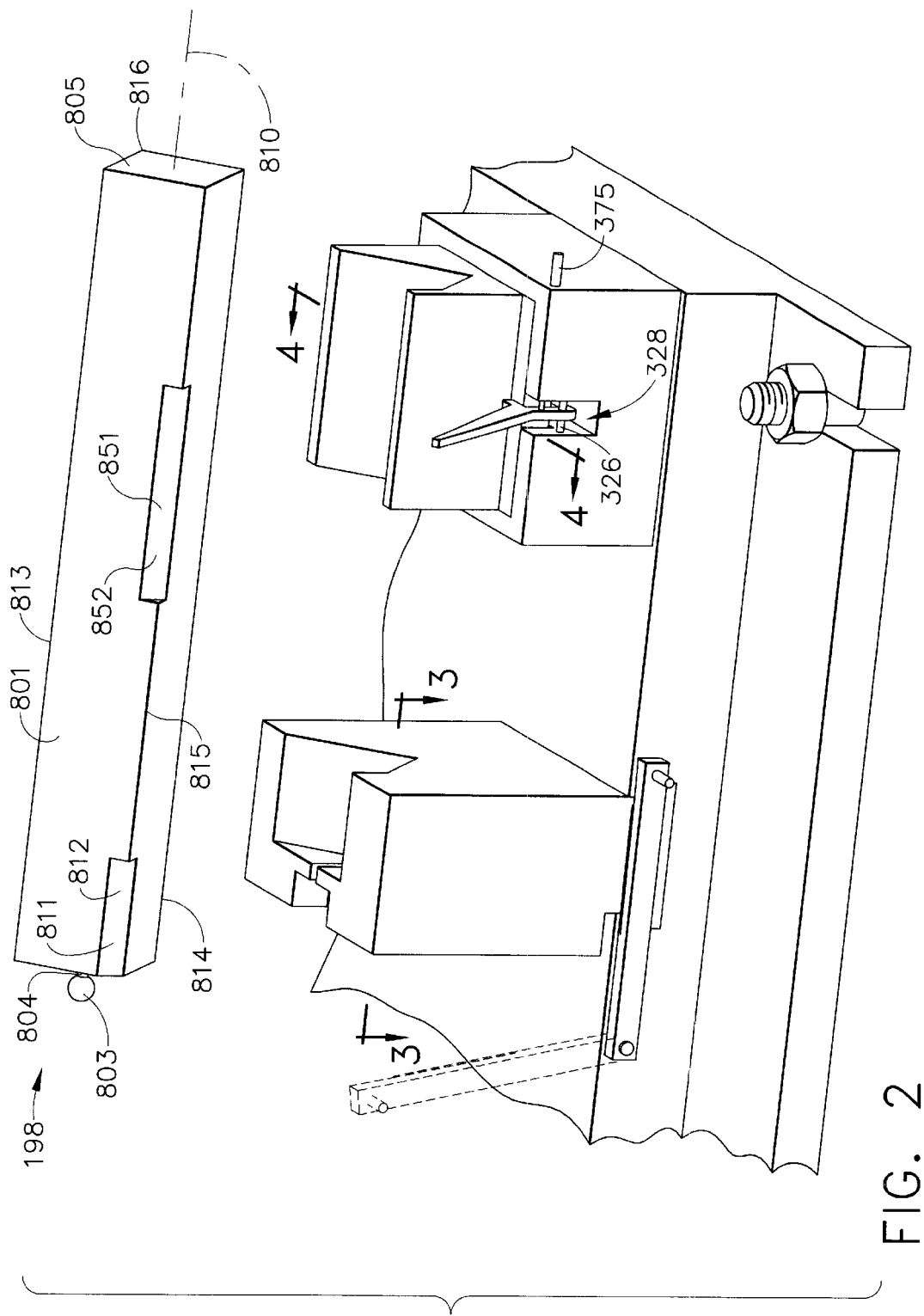
FIG. 2 shows a schematic representation of the modular tooling apparatus shown in FIG. 1, with the first and second inserts installed in the first and second pockets of the base. In this Figure, the extraction/ locking device is shown in its locking position. A securement is shown in the foreground of the Figure. A workpiece is also shown.

An embodiment of the invention is shown in FIGS. 1 and 2. FIG. 1 shows a base 20 having a first attachment surface comprising a first pocket 30, a second attachment surface comprising a second pocket 40, a first insert 50 that can associate with the first pocket, and a second insert 60 that can associate with the second pocket. The inserts 50 and 60 are shown separated from the base 20.

The base 20 is configured to be attached semi-permanently to a metalworking machine (not shown). The head of T-bolt 23 is secured in a T-slot in a table 8 of the metalworking machine. The shank of the T-bolt passes through a slot 24 in the base, and the T-bolt is capped with a hexagonal nut 25 that, when turned, presses downward upon the top surface of the base 20 to secure the base to the table 8. Several T-bolts are commonly employed. as is common practice in the metalworking arts. The base can be secured to the table by means well known in the art. In addition to T-bolts mentioned above, the base can be secured to the table with: standard threaded bolt downward through a slot in the base, engaging a T-nut in a slot in the table, a threaded rod with a T-nut at the bottom and a standard hexagonal nut at the top; and a C-clamp, clamping a top surface of the base with the bottom of the table; a threaded bolt engaging a tapped hole in the table; a custom-machined table into which the base slidably secures; and a cam-action clamp having a T-head rod in the T-slot of the table, whereby actuating the cam causes downward pressure against the tooling base by pulling upward against the T-head rod. Those having ordinary skill in the metalworking arts will recognize these and alternative means for attaching the base 20 the metalworking machine. The attachment of the base to the table includes the step of orienting and positioning the base whereby a reference point on the base cooperates with a reference point on the metalworking machine to define a position of the base relative to the metalworking machine. The fixed reference point can include one or more points on the base. The fixed references typically include a spherical device attached to the base 20 and a removable electronic indicating system temporarily attached to the spindle of the metalworking machine (not shown). Alternatively, a manual method of orienting and positioning the base can be employed. The manual method, well known in the machining arts, relies upon a dial indicator temporarily secured to a fixed feature of the metalworking machine while the indicator arm rests upon an appropriate linear or planar feature of the base. The table is then moved so that multiple readings are obtained from various locations of the linear or planar feature relative to the fixed feature. Those having ordinary skill in the metalworking. arts will recognize these and alternative means for providing an indication of the location thereof to a control system that can be employed in operating the machine.

The base 20 can be constructed to comprise a plurality of members that are joined together semi-permanently. The members are typically comprised of non-movable members and moveable members. Non-movable members can comprise a series of distinct laminar plates, aligned and fastened together, as by bolting. The moveable member can comprise one or more of a variety of plates, hardware and devices that assist in the loading and support of the workpiece, and the discharging of the machined workpiece from the modular tooling apparatus. An example of a moveable member includes, but is not limited to, a force means such as a hydraulic or pneumatic clamp, a manual toggle clamps, a fixed workpiece support member, and a pneumatic or hydraulic ejector. A pocket located on the base can be associated with a movable member or plate of the base, or with a non-moveable member of the base, as herein after described.

The attachment surface of the base typically comprises a pocket. A pocket can be a depression in the surface of the base that is configured to receive an associating element of an insert. A pocket can be a depression in the surface of the base that is configured to receive an associating element of an insert. The attachment surface typically comprises a pocket, the pocket comprising a plurality of surfaces that collectively define a locating feature of the pocket.

The pocket 30 shown in FIG. 1 has a backwall 35, a rear sidewall 34, an opposed front sidewall, and a floor 33. The sidewalls arc typically parallel to each other, and perpendicular to the backwall. Each wall is typically perpendicular to the bottom 33. The front and rear sidewalls have overhanging ledges 37 and 38, respectively, with a clearance recess there below.

The pocket 30 has a locating feature that comprises a plurality of locating members defined by the bottom 33, the sidewall 34, and the backwall 35. These three planar locating features cooperate to identify a characteristic locating point 31.

The insert 50 has an upper portion and a lower portion 56. The lower portion 56 of the insert has a front wall 57, a backwall 55, a rear toe 59 having rear sidewall 54, a front toe 58 having a front sidewall, and a bottom 53. These features are particularly configured and oriented to associate with corresponding features of the pocket 30.

Insert 50 associates with the pocket 30 by sliding lower portion 56 through the opening 36 of pocket 30. The insert is configured to be separated from the pocket by hand, without the use of a mechanic's tool, such as a wrench or screwdriver. The insert 50 has a locating feature which comprises a plurality of locating members defined by the bottom 53, sidewall 54, and backwall 55 of the lower portion 56. Theses three planar locating features cooperate to identify a characteristic insert locating point 51. The insert can have a plurality of locating points, defined by the cooperation of one or more locating features, which can include surfaces. edges and points on the surface of the insert.

The upper portion of insert 50 has a workpiece support feature upon a surface thereof. The workpiece support feature comprises a plurality of workpiece support members defined by the confronting inclined planes 71 and 72, and the ball joint restraints 73 shown in FIG. 5. These support surfaces support corresponding surfaces on the workpiece 198 as shown in FIG. 2. Insert 50 is configured to define a location of the workpiece support feature relative to the insert locating point 51. The workpiece support members 71, 72, and 73 are precisely machined to provide characteristic positioning (in the x, y and z coordinate space) of the workpiece support feature relative to the insert locating point 51.

The extent to which the insert 50 is restrained against movement relative relative to the base 20 is limited by three factors: (1) the precision employed in manufacturing the associated parts, (2) the ability to place the insert in and remove it from the pocket, and (3) the ability to restrain the insert against movement in the +x direction.

The lower portion 56 is configured to fit precisely into pocket. 30 whereby the locating feature of the insert and the corresponding locating feature of the pocket cooperate to define a location of the workpiece support feature relative to the base 20. The functionality of the insert and pocket arrangement is that the insert slides into the pocket to establish a precise spatial relationship therewith. Thus, the relationship between corresponding features when the insert is seated in the pocket is confronting. However, during removal and insertion of the insert relative to the pocket, the relationship between corresponding features is sliding. The sliding relationship is particularly apparent with respect to the pocket sidewalls and toe sidewall of the insert, to the clearance recess below the ledges of the pocket and the toes of the insert, and to the floor of the pocket and the bottom of the insert. The lower portion 56 of the insert 50 must be carefully constructed such that the dimensions thereof allow for a sliding relationship with the pocket 30, but with minimum movement of the insert within the pocket. For inserts having characteristic dimensions on the order of a few inches (several centimeters), the space between corresponding features is typically about one mil (one mil equals 0.001 inch, or 25 microns). The clearance between corresponding vertical surfaces is typically less than about 0.001 inch per side, per inch (1 micron per side, per millimeter) of linear dimension of that surface. In the design and construction of the insert and pocket. one can compromise between free movement and rigid positioning of the insert, thereby reasonably meeting both requirements. Dimensional tolerances appropriate to such clearances can be achieved by various grinding operations, or by reaming a hole, or by cutting a contoured surface by electrical discharge machining (EDM), using a moving wire as the cutting electrode (wire EDM).

Dimensional tolerances of the pocket 30 can be more difficult to achieve than the dimensional tolerances of the inserts. Further, accurately machining the interior corners between the front or back surfaces and adjacent side surfaces is particularly difficult. A typical solution involves the use of ground plates for the side surfaces of the pocket, and of one or more ground spacer blocks for the front, back and bottom surfaces of the pocket. In a simple form. the base is assembled from three plates that are pinned and bolted together, and separated only for maintenance of the modular tooling apparatus. A typical material for both the base and an insert is hardened tool steel, which resists many assembly methods, especially welding. The insert is then ground to fit the pocket, allowing for the clearance dimensions set forth hereinabove.

Figure 3:
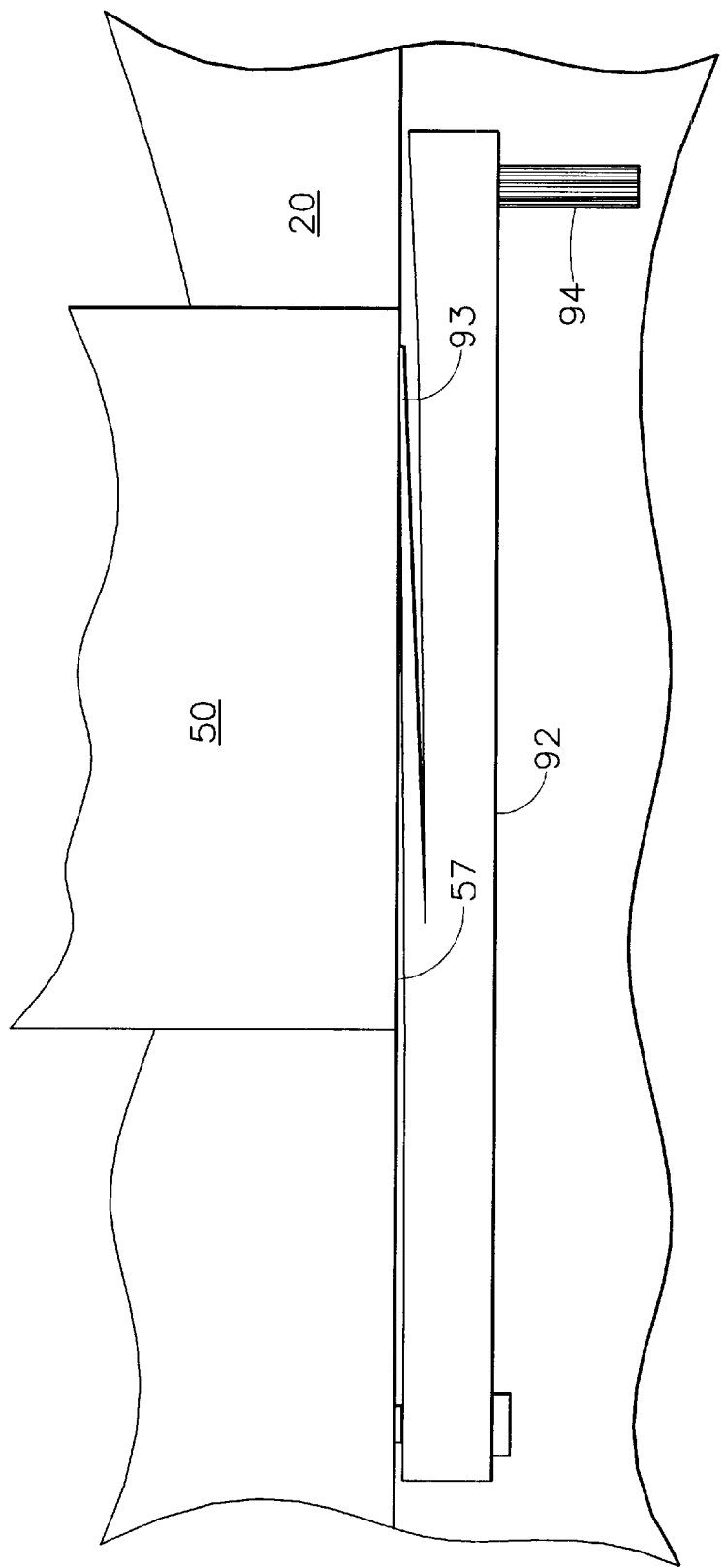
FIG. 3 shows a plan view of the securement shown in FIG. 2.

In the embodiment of the invention shown in FIG. 1, a securement 90 is associated with the modular tooling apparatus to separably secure the insert in the pocket. FIG. 2 shows the securement in a securing position, and in a non-securing position with dashed lines. The securement 90 comprises a pivot 91 and a body 92 that can move pivotally from a first position where the insert can be inserted and removed from the pocket, and a second position where the securement restrains the insert from movement within the pocket in the +x direction. FIG. 3 shows the securement body 92 can comprise a biasing member comprising an elongated biasing member 93 that extends away from and along the wall of the body 92 confronting the insert. In the first (unsecured) position, the biasing member 93 projects into the plane of the front wall 57 of the insert. When the securement is in the second position, the biasing member 93 is forced to bend inward toward the securement body 92. Due to the resilience to bending of its material (typically a tool steel), the biasing member 93 exerts a biasing force against the front wall 57 to secure the insert in position. The securement is provided with a handle 94 to assist moving the body between positions. Typically the securement 90 is configured to be manipulated between its first and second positions without the use of a mechanic's tool.

The insert 50 also comprises a pocket orientation feature so that the insert 50 can be associated with pocket 30 in only one orientation. The pocket orientation feature comprises rear toe 59 having a height higher than that of front toe 58. As shown in FIG. 2, the rear toe 59 of lower portion 56 can enter the pocket within the corresponding clearance of the opening 36 under rear ledge 38. If the insert is turned 180°, the height of the same rear toe 59 prevents insertion within the shorter clearance of the opening under front ledge 37. This feature prevents a user of the apparatus from inserting the insert 50 improperly into pocket 30.

The insert 50 also comprises a workpiece orientation feature so that a workpiece 198 can have only one orientation when associated with the workpiece support feature of the properly-inserted insert 50. In FIG. 2, the workpiece orientation feature comprises a shoulder that extends upwardly from the support surface comprising workpiece support member 72. The shoulder is configured to register with a flat 811 having a face 812 that has been machined along edge 815 only of the workpiece body. The shoulder is also configured to prevent placement of the workpiece upon the support members 71 and 72 if the workpiece is placed into the apparatus in any of the other three orientations where body edges 813, 814 or 816 confront the shoulder.

The pocket 40 is defined by front wall 47, back wall 45, sidewalls 44, and floor 43. The sidewalls 44 are typically parallel to each other, as are the front wall 47 and the back wall 45. Each of these walls is typically perpendicular to the floor 43. The back wall 45 is provided with an overhanging lip 46 that is typically positioned opposite an extraction/locking device. The overhanging lip 46 has a clearance recess 48 there below.

The insert 60 is provided with features that correspond to the features of the pocket 40. The lower portion 66 of the insert 60 is defined by a front surface 67, a back surface 65, side surfaces 64, and a bottom surface 63. These features are particularly configured and oriented to associate with corresponding features of the pocket 40. Correspondence between features of the pocket 40 and insert 60 is indicated by a common third digit of the respective identification numbers; for example, the back wall 45 of the pocket corresponds to the back surface 65 of the insert. In addition, insert comprises an upper surface 62 configured to engage the extraction/locking device. The lower portion of the insert also comprises a toe 68 positioned adjacent to a first end opposite the upper surface 62, the toe 68 comprising an upper restraining surface 366 thereon, and relief curvatures 69.

The functionality of the insert and pocket arrangement is that the insert must slide into the pocket and establish a precise spatial relationship therewith. Thus, the relationship between corresponding features when the insert is seated in the pocket is confronting. However, during removal/insertion of the insert relative to the pocket, the relationship between corresponding features is sliding. The sliding relationship is particularly apparent with respect to front wall 47 and front surface 67, to sidewalls 44 and side surfaces 64, and to underside of overhanging lip 46 and the upper restraining surface 366. There is some sliding between the floor 43 and the bottom surface 63 as the upper restraining surface 366 of toe 68 is engaged with the clearance recess 48. The engagement of the upper restraining surface 366 with the overhanging lip 46 secures that side of the insert into the pocket.

The present invention provides an extraction/locking device 370 that restrains the insert against movement within the pocket. For convenient use of the device, wherein the extraction/locking device is typically configured to move between the first configuration and the second configuration without use of mechanic's tools. Typically, the extraction/locking device comprises a means for pivoting the device between a first position and a second position, a locking feature configured to engage the insert and secure it in the pocket whenever the extraction/locking device is pivoted to the first position; and an extraction feature configured to at least partially extract the insert from the pocket whenever the extraction/locking device is pivoted away from the first position to the second position.

As shown in FIG. 2, the extraction/locking device 370 restrains the insert against movement in the +z direction (upward), particularly at the front side of the insert. The extraction/locking device 370 is pivotably disposed in a slot 328 in the base 20. The width of the slot is exaggerated in FIGS. 1 and 2 to better illustrate the functionality of the extraction/locking device. One means for pivoting the device comprises a pivot pin 326 disposed in coaxial holes (not shown) in the base, and pivot hole 379 in the extraction/locking device 370 (shown in FIG. 4). The extraction/locking device typically comprises a locking feature that is configured to engage the upper surface 62 when the extraction/locking device is disposed in its first position, to restrain the insert in the pocket. When the extraction/locking device is rotated forward to its first. or locked, position, a retaining arm 371 slides over the upper surface 62 of the insert 60. This position is illustrated by the dashed lines in FIG. 4. A handle 372 of the extraction/locking device provides for convenient manipulation thereof by a technician installing the insert 60 in the pocket 40, without the need for a mechanic's tool, such as a wrench or screwdriver. The combined action of the retaining arm 371 and the overhanging lip 46 fully restrains the insert 60 against movement in the +z direction.

A detent means, to retain the extraction/locking device in its first position, is provided. In a typical embodiment of the detent means, a retaining pin 375 is slidably disposed in a hole through a front aspect of the base 20, and biased against the extraction/locking device, such that it snaps into a locating hole 376 in the extraction/locking device shown in FIG. 4 when the extraction/locking device is moved to its first position. The detent means urges the extraction/locking device to remain in its first position. A knob or knurled surface on the exposed end of the retaining pin facilitates convenient disengagement thereof from the hole in the extraction/locking device.

Figure 4:
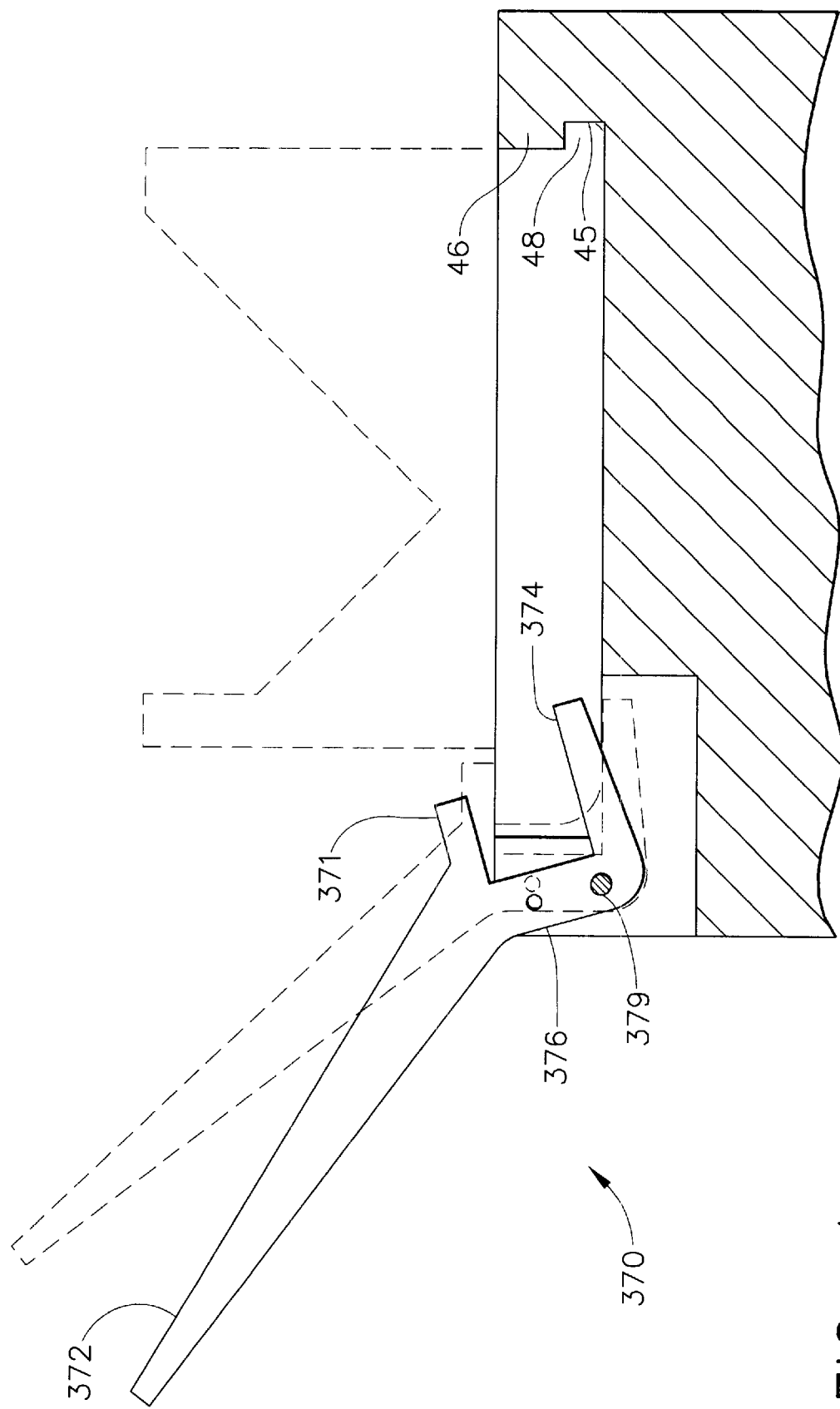
FIG. 4 shows a cross sectional view through the modular tooling apparatus shown in FIG. 2. In this Figure, the second insert and the extraction/locking device are shown in dashed lines.

The extraction/locking device provides an additional function, namely, to facilitate extraction of the insert 60 from the pocket 40. Typically, an extraction/locking device can be used when an insert 60 does not have a convenient handle for a technician to grasp to extract the insert from its pocket. The extraction/locking device typically comprises an extraction feature that is configured to press against a surface of the lower portion 66 of the insert 60, as the extraction/locking device is pivoted to its second position. As the extraction/locking device 370 is rotated toward its second, or extraction, position, a toe 374 exerts an upward force on the bottom 63 of the insert 60, thereby exposing the front and back surfaces of the insert sufficiently for a technician to grab the insert. The second position of the extraction/locking device is shown in FIG. 4 by solid lines.

Pocket 40 has a corresponding locating feature that is collectively defined by a plurality of surfaces. The locating feature comprises a plurality of locating members defined by the floor 43, the rear sidewall 44, and the backwall 45. These three planar locating features cooperate to identify a characteristic locating point 41 of the pocket 40.

The corresponding insert 60 has a locating feature, which comprises a plurality of locating members defined by the bottom 63, rear sidewall 64, and backwall 65. Theses three planar locating features cooperate to identify a characteristic locating point 61 of the insert 60.

Figure 6:
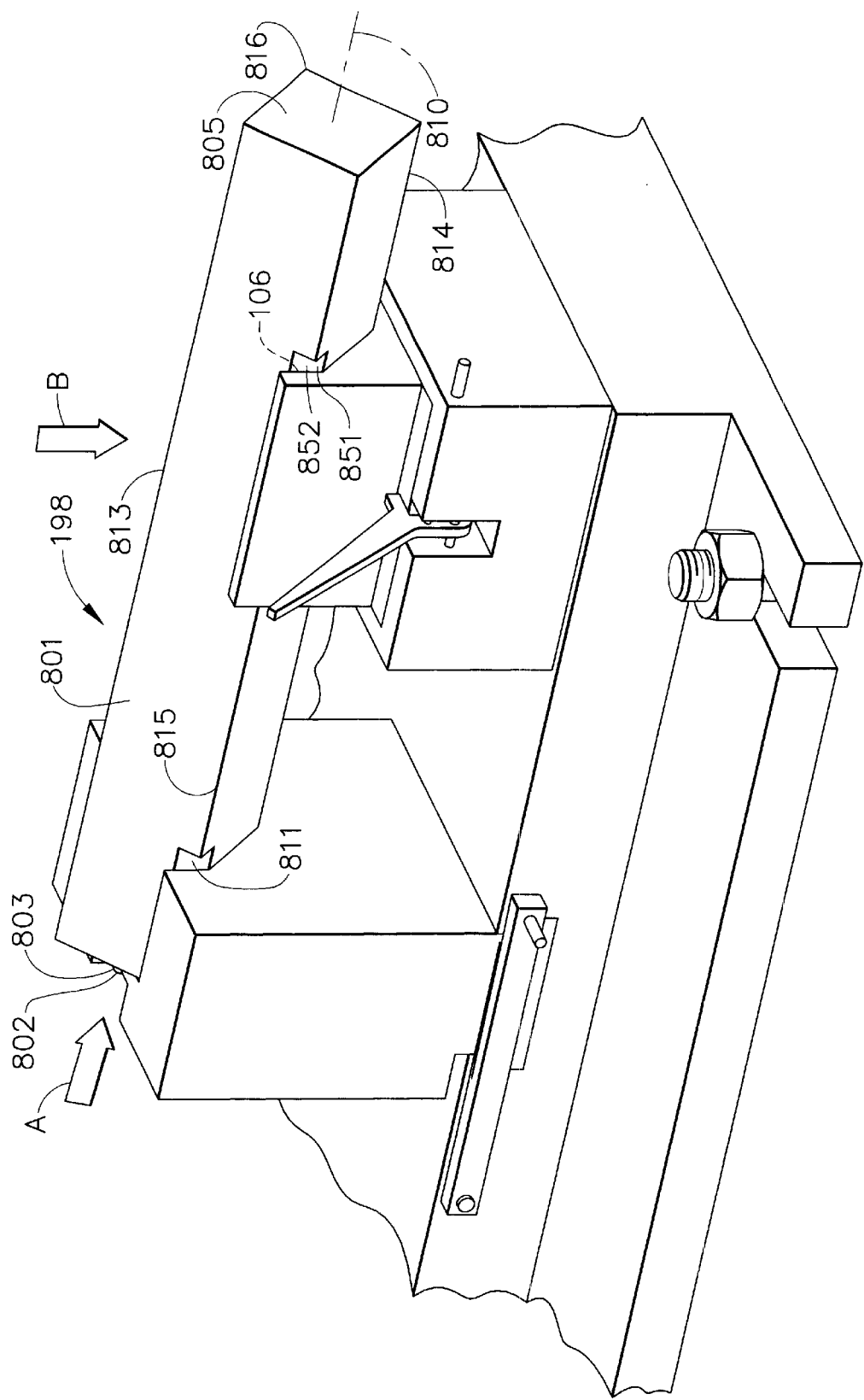
FIG. 6 shows a schematic representation of the first workpiece in the modular tooling apparatus of FIG. 2, illustrating how the workpiece can be secured in the apparatus.

The insert 60 has a workpiece support feature upon a surface thereof. When insert 60 is inserted into pocket 40, the locating points 41 of the pocket and 61 of the insert become co-located. Co-locating the locating points thereby defines the characteristic location of the workpiece support feature of the insert relative to the reference point of the base 20. The workpiece support feature comprises a plurality of workpiece support members defined by the confronting inclined planes 76 and 77. These support surfaces support corresponding surfaces on the workpiece as shown in FIG. 6. The workpiece support members 76 and 77 are precisely machined to provide characteristic positioning (in the x, y and z coordinate space) of the workpiece support feature relative to the insert locating point 61.

The insert 60 also comprises a pocket orientation feature, to associate the insert with the pocket 40 in only one orientation. The pocket orientation feature comprises toe 68 of the insert and its association with clearance recess 48 of the pocket. If the insert is turned 180° about its z axis (not shown), it can not be inserted into the pocket. This feature prevents a user of the apparatus from inserting the insert 60 improperly.

The insert 60 also comprises a workpiece orientation feature so that a workpiece 198 can have only one orientation when associated with the workpiece support feature of the properly-inserted insert 60. The workpiece orientation feature comprises a shoulder 106 that extends upwardly from the support surface comprising workpiece support member 77. The shoulder 106 is configured to register with a flat 851 of the workpiece 198 (shown in FIG. 6) that has been machined only along edge, 815 of the workpiece body. The shoulder 106 prevents placement of the workpiece upon the support members 76 and 77 if the workpiece is placed into the apparatus in any of the other three orientations where body edges 813, 814 or 816 confront the shoulder 106.

FIG. 2 also shows a workpiece 198 comprising a rectilinear body 801 having a square cross section, and a ball joint 802 affixed to a first end of the body. The ball joint 802 comprises a spherical head 803 adjoined to the body 801 by a cylindrical neck 804. The head 803 and neck 804 are aligned with the centerline 810 of the workpiece. Flat 851 has a face 852 that has been machined in a prior metalworking operation along the length of edge 815 of the body 801. The face 852 is a planar surface that lies parallel to a plane passing through workpiece edges 813 and 814.

FIG. 6 shows the modular tooling apparatus having a workpiece 198 positioned upon the workpiece support features of the inserts 50 and 60. The workpiece 198 is shown prior to the metalworking operations to be performed using the modular tooling apparatus.

Under the forces applied by milling machines of a metalworking operation, the workpiece is prone to movement, shifting and vibration. To prevent movement of the workpiece during the metalworking operation, the workpiece is typically secured to avoid movement and/or vibration during machining. Typically, an insert is secured in a pocket whereby only one direction is unsecured by the pocket itself (that is, the position by which the insert was inserted into the pocket). Pocket and insert configurations are selected to avoid the action of forces from the metalworking operation upon the insert in that one direction. Typically, an insert and pocket will not be configured whereby the force from the metalworking operation applies a force upon the insert in the direction of the insert's insertion or removal. An insert is more typically configured whereby, when a metalworking operation exerts force upon the workpiece 198, the workpiece will exert a resulting force upon the insert that contributes to securing the insert into the pocket. That is, the force of the metalworking operation on the workpiece assists in securing the insert to the base. A secondary consideration in designing the modular tooling apparatus is minimizing the extent of forces related to clamping a workpiece that act in the one direction associated with placing the insert in its corresponding pocket.

The forces exerted upon a workpiece by a metalworking machine can require one or more force means to secure the workpiece. Any shifting, moving, flexing, or vibration of the workpiece during a metalworking operation can result in improper machining of the workpiece. An insert of the present invention can be used to position the workpiece in the proper position for the metalworking operation, and can also be used to secure the workpiece by resisting movement by virtue of its rigid attachment to the base and table, or by exerting a force upon the workpiece. The modular tooling apparatus of the invention can employ one or more means of exerting a restraining force upon the workpiece. The restraining force means is particularly important when the workpiece is flexible or bendable. Typically, the restraining force is exerted on the workpiece as close to the path of the metalworking machine as is practical, to maintain the rigidity of the workpiece during the metalworking operation.

Typically the securing force that is applied to the workpiece exerts, through the workpiece, a force upon an insert that is securing or supporting the workpiece. A securing force is typically configured whereby the force upon the insert is in a direction that contributes to securing the insert into the pocket.

Figure 5:
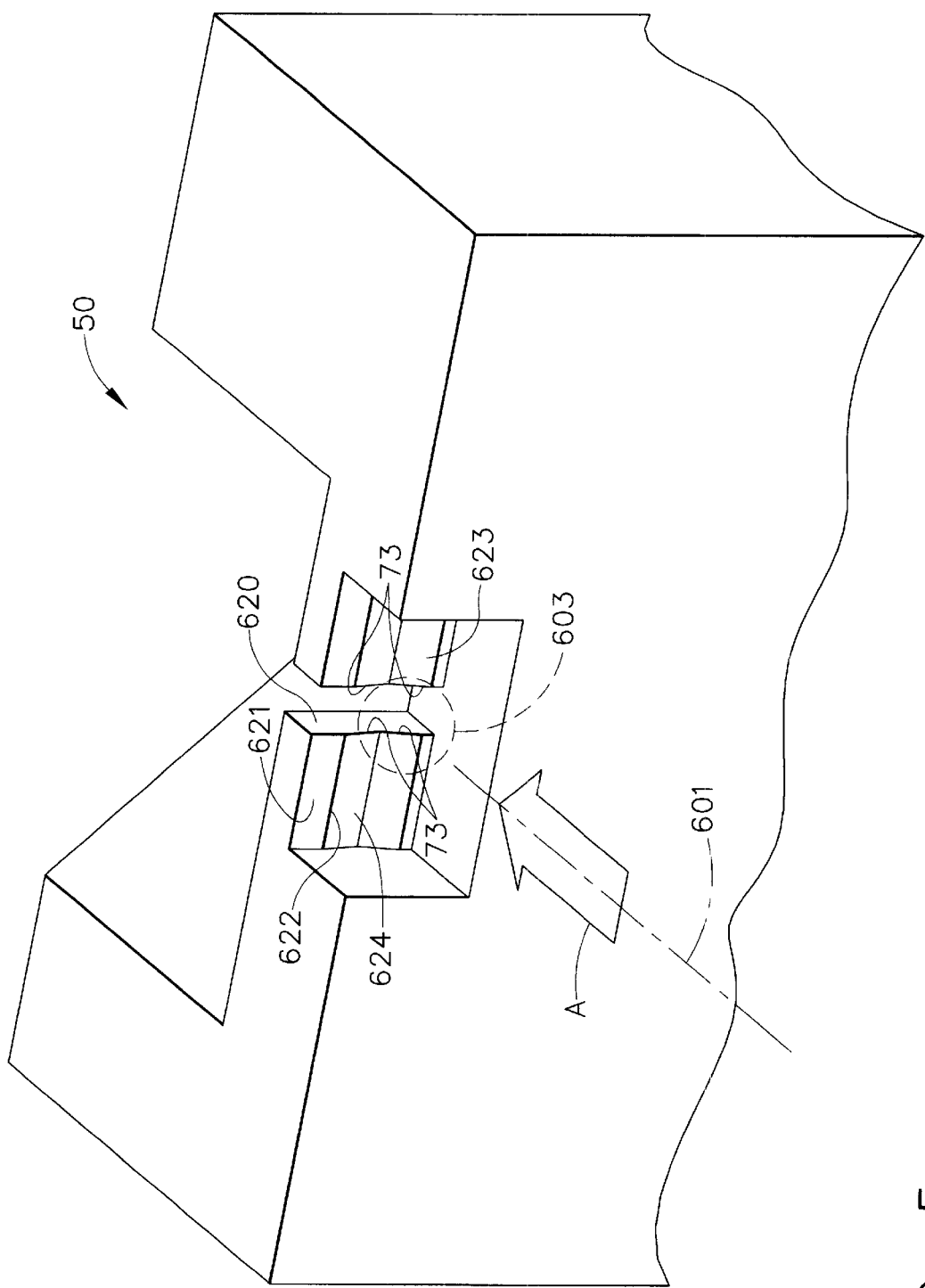
FIG. 5 shows a partial schematic view of the insert shown on the left in FIG. 2, illustrating how the workpiece can be secured to the insert.

A first force means can be configured to apply a force upon the head 803 of the workpiece 198 to secure the workpiece against the ball joint restraints 73. The direction of force of the first force means is shown in FIG. 5 as force A applied against head 803, shown in dashed lines. A means well known in the art can be used to exert force A upon head 803, including a pneumatic or hydraulic piston and a manual toggle clamp as described in Manufacturing Engineering and Technology (Fourth Edition), by Serope Kalpakjian and Steven R. Schmid. The manual toggle can have a spindle tip that is shaped to securely engage the head 803. Typically, the force means engages and secures (and disengages from) the head 803 of the workpiece quickly (that is, within a few seconds), and does not require a mechanic's tool to engage or disengage from the head 803. Typically, the force means is an element permanently or semi-permanently affixed to the base 20, and is configured and positioned such that force A is applied precisely upon the head 803.

Figure 7:
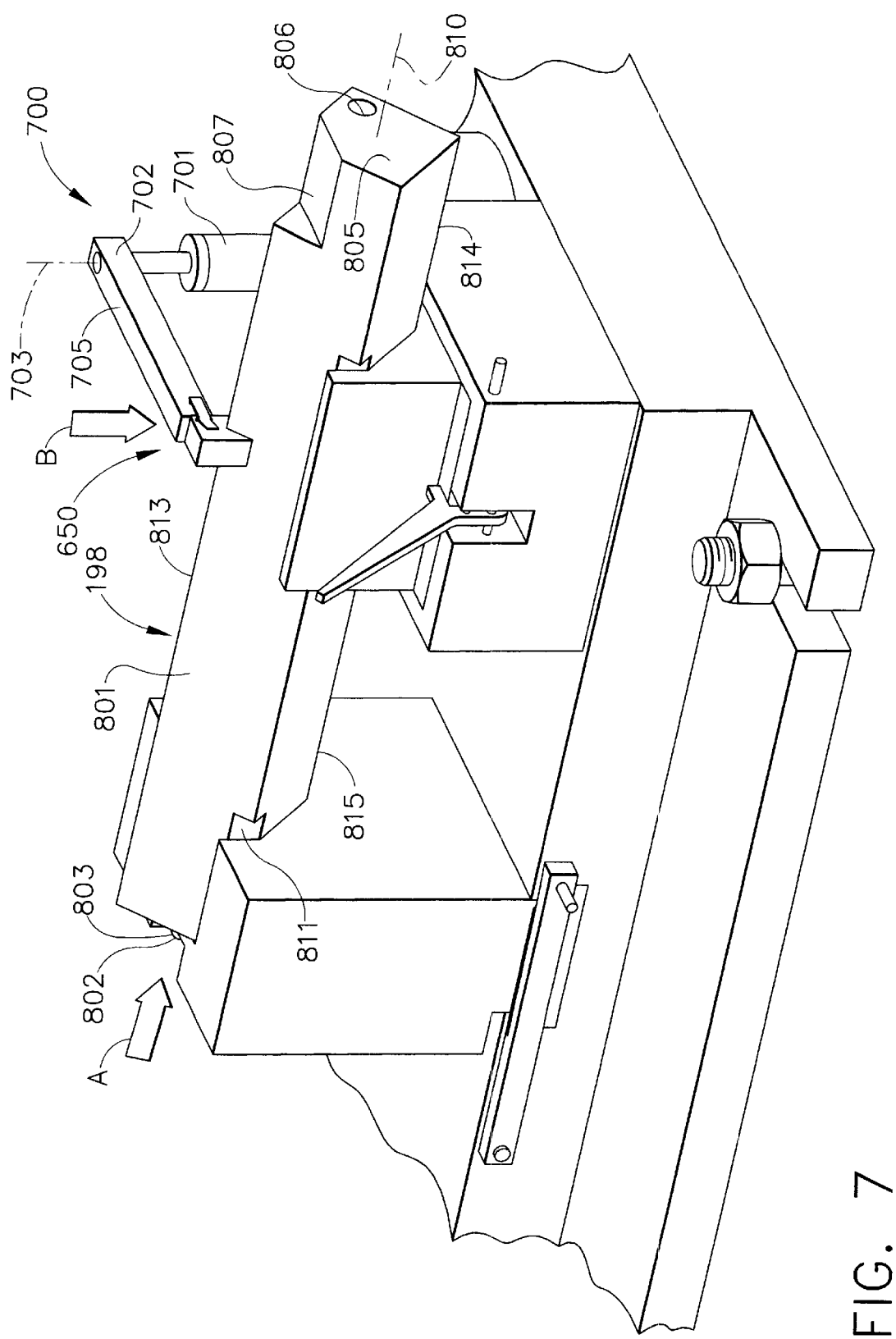
FIG. 7 shows a schematic representation of a workpiece in the modular tooling apparatus after completion of the metalworking operation, and illustrating how the workpiece can be secured in the apparatus with a movable insert.

A second force means can be configured to apply a force upon the upper surface of the body 801 along edge 813 to secure the workpiece against the workpiece support members 71 and 72. The direction of the second force means is shown in FIG. 6 as force B. A means well known in the art can be used to exert force upon body 801, including a toggle clamp having an appropriately-shaped spindle tip to conform to the body along edge 813, as discussed above. Another force means for applying force is a hydraulically-actuated, pivoting clamp device 700 as shown in FIG. 7, having a vertically-aligned hydraulic cylinder 701 having an arm 705 affixed to the top end 702 of the hydraulic cylinder and extending outward. The hydraulic cylinder is typically positioned upon and affixed to the base. The arm can pivot about the axis 703 of the hydraulic cylinder, and typically is configured to pivot between a securing position, as shown in FIG. 7, and a second position clear of the workpiece. The second end of the arm has a clamp 650 suspended there from. The clamp has a shape configured to conform to the shape of the body 801 when positioned thereon. After a workpiece 198 has been placed into the insert 50 upon the workpiece support members 71 and 72, into insert 60 upon the workpiece support members 76 and 77, and has been secured against ball joint restraints 73 with force A, the clamp arm 705 is pivoted and locked in the securing position over the body 801, and the hydraulic cylinder 701 is activated to lower the clamp 650 down to engage the upper surface of the body 801. The hydraulic cylinder 701 can apply a directional force downward upon the clamp 650, which in turn applies force B onto the workpiece 198 to secure it in place against the workpiece support features 76 and 77 of insert 60.

Figure 8:
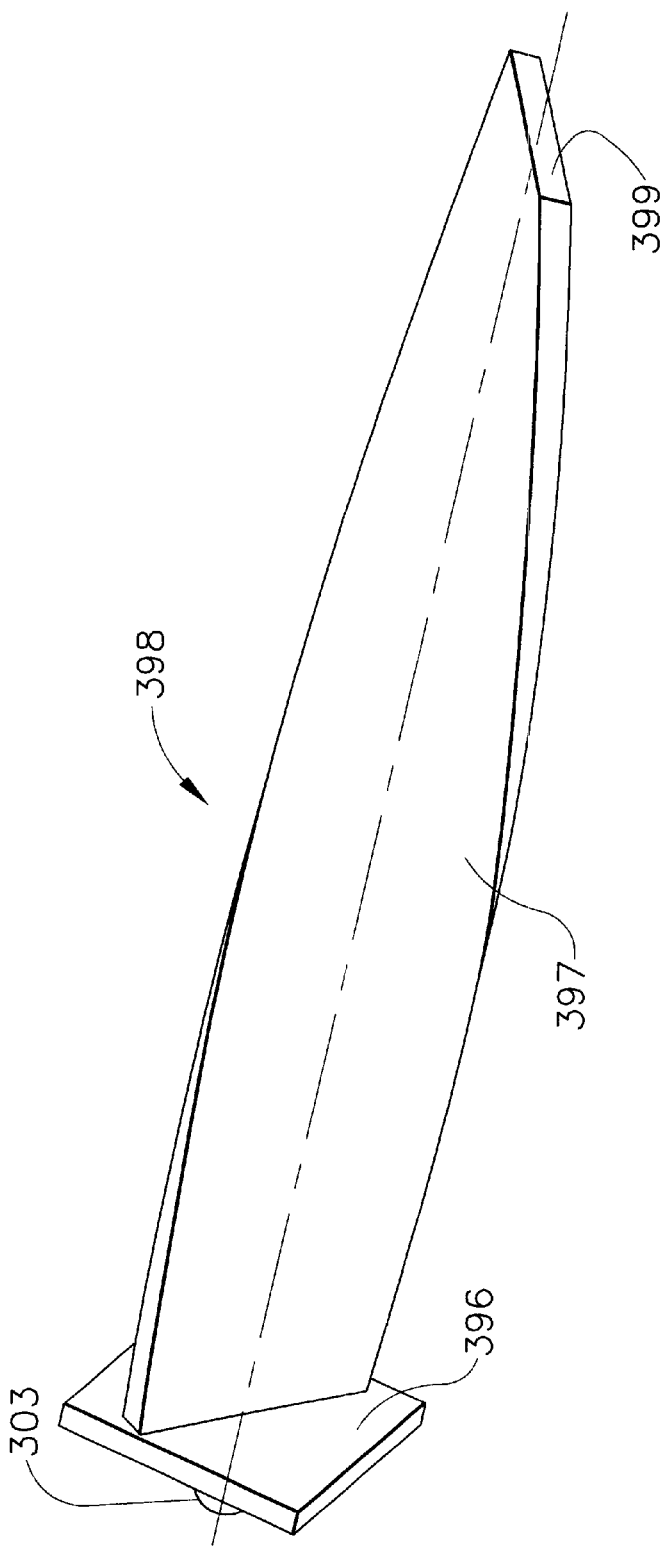
FIG. 8 shows a schematic representation of a workpiece that can be machined on a modular tooling apparatus.

In yet another embodiment of the invention, a workpiece 398 shown in FIG. 8 has a characteristic configuration. The workpiece is typical of a compressor blade for a gas turbine engine. In a typical metalworking operation on the compressor blade, the end 399 of the airfoil 397 is trimmed to precise dimensions relative to its dovetail, illustrated in the Figure as a ball joint 303. The relatively thin cross section of the airfoil 397 along its length leaves it prone to movement and vibration in a typical milling operation that trims the end of the blade.

Figure 9:
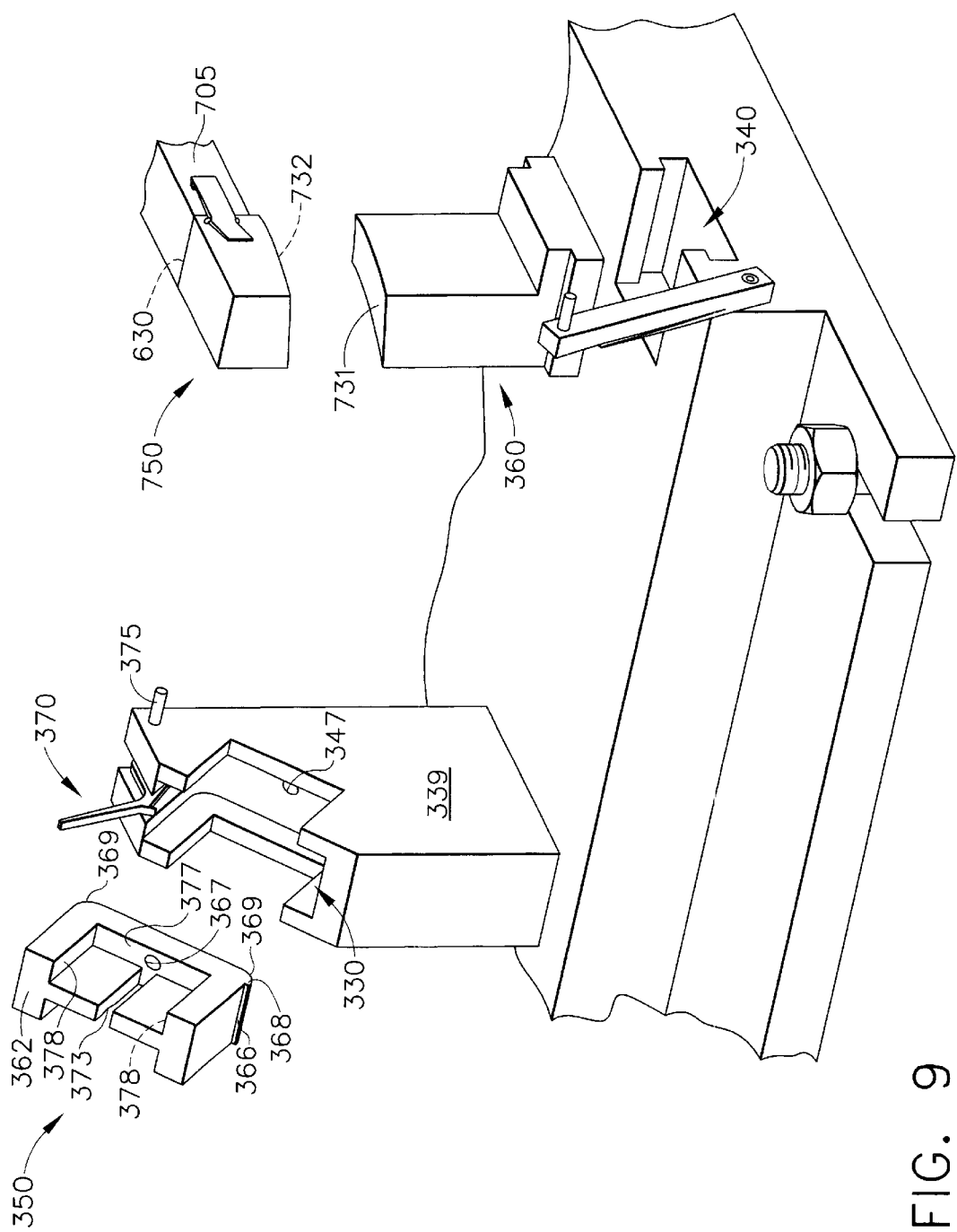
FIG. 9 shows a schematic representation of a modular tooling apparatus having a plurality of inserts that associate with corresponding pockets in the base, to support the workpiece shown in FIG. 8. An extraction/locking device is shown with the pocket on the left of the Figure in its extracting position.
Figure 10:
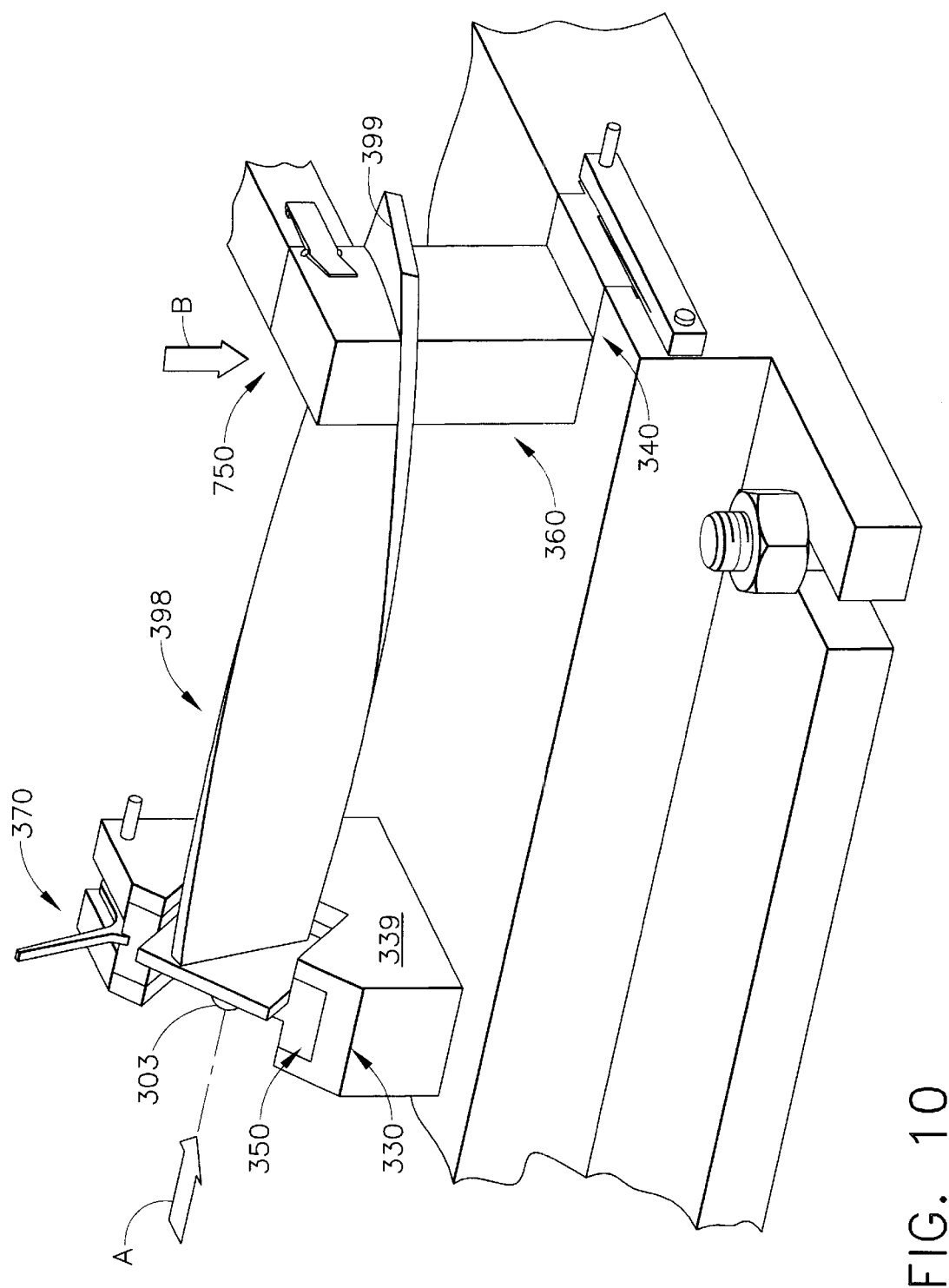
FIG. 10 shows a schematic representation of the workpiece of FIG. 8 positioned on the modular tooling apparatus shown in FIG. 9, having inserts configured to support the characteristic features of the workpiece. The extraction/locking device is shown in its locking position.

FIG. 9 shows a modular tooling apparatus for milling the end of the compressor blade 398. The apparatus comprises a base having a first pocket 330 on the surface 339 of the base, and a second pocket 340. The apparatus also has a first insert 350, shown separated from its associated pocket 330, and a second insert 360, shown separated from its associated pocket 340. The apparatus also has a third insert 750, which is shown inserted into its pocket 630. The first insert 350 is used to position and secure the dovetail 303 of the blade. The second insert 360 supports the underside of the airfoil 397 at a position near the end of the blade. The third insert 750 supports the upper side of the airfoil 397, opposing the second insert 360. A toggle clamp provides a force A, shown in FIG. 10, along the y axis of the workpiece against the ball joint in the +y direction. A hydraulic cylinder (not shown) has an arm 705 and an insert 750 associated with a pocket 630 positioned on the arm 705. The cylinder provides a downward force B onto the moveable third insert 750 after positioning over the airfoil, to firmly secure the airfoil section from movement by pressing it against second insert 360, as shown in FIG. 10. The combination and cooperation of the inserts 350, 360 and 750 provide precise positioning and securement of the workpiece during the end trim milling operation.

Insert 350 has a lower portion having a configuration similar to insert 60 shown on the right side of FIG. 1. The insert 350 has a lower portion having a toe 368 having an upper restraining surface 366, a upper surface 362, and relief curvatures 369. The insert has an upper portion having a plurality of workpiece support features comprising dovetail restraints 373, and support members 377 and 378. The dovetail restraints are configured to cooperate with force A (shown in FIG. 9) to secure and prevent the dovetail 303 from movement in any direction. The support members 377 and 378 are configured to position the blade base 396 there between.

Pocket 330 is configured to associate with and secure insert 350 to the base. Pocket 330 is positioned on base surface 339 of the base, and is oriented at an angle of about 45° from the base. The insert 350 is inserted into the pocket and secured therein with an extraction/locking device 370, shown in FIG. 10 in the extracting position. The orientation of the insert provides a convenient angle for inserting and removing the workpiece.

Insertion of the workpiece onto the apparatus is typically by hand. The workpiece after machining is typically removed by an automatic ejection means known in the art. Base surface 339 can be configured with a passage 347 through which a pneumatically-actuated ejecting pin (not shown) can be thrust from within the base. After machining the workpiece, the ejecting pin is actuated to pass through an aperture 367 in the surface 377 of the insert 350. The ejecting pin contacts the blade base 396, and ejects the workpiece from the assembly.

Insert 360 has a lower portion configured similar to insert 50 shown in FIG. 1, though oriented in the y direction. Insert 360 associates with pocket 340, which is likewise configured similar to pocket 40 shown in FIG. 1. Insert 360 has a workpiece support feature comprising workpiece support surface 731 that is precisely machined to a contour that mates with the contour of the lower surface of the airfoil 397 at its place of support. Insert 750 has a workpiece support feature comprising workpiece support surface 732 that is precisely machined to a contour that mates with the contour of the upper surface of the airfoil 397 at its place of support.

The dovetail 303 of the workpiece is first positioned into insert 350, and with its airfoil supported by insert 360. Moveable insert 750 is positioned to register with the upper surface of the airfoil. Once all inserts are positioned and securing forces A and B are applied (to the dovetail and to the movable insert 750, respectively), the workpiece is secured and ready for machining.

In a metalworking operation involving compressor blades, when production requires a change from machining a blade 398 to a next-sized compressor blade member of the same family, the technician removes the set of inserts 350, 360 and 750 shown in FIGS. 9 and 10, and installs and secures a next-sized set of member inserts (from the family of inserts) that correspond to the next-sized compressor blade. The next-sized set of member inserts have lower portions that associate with respective base pockets 330, 340 and 630, and are functionally identical to the lower portions of inserts 350, 360 and 750 that have been removed. The next-sized compressor blade is then inserted into the workpiece supports of the set of next-sized set of inserts. The next-sized set of inserts has been configured to position the next-sized compressor blade in a location and orientation that permits milling of its end without changing the tooling base, or making any adjustment in the position or orientation of the base 20 upon the metalworking machine. An entire family of compressor blades can be machined on a modular tooling apparatus using a common base and a corresponding family of sets of inserts.

As indicated above, the base of the present invention can be made from a series of distinct laminar plates, aligned and fastened together. Such laminar plates can be aligned by drilling and reaming mating holes through two or more such plates, and then pressing dowel pins through the mating holes. Alternatively, keyways can be cut into abutting surfaces of adjacent plates, and rectangular keys inserted therein. Any other means for precisely aligning one plate with respect to an adjacent plate could be employed. The laminar plates can be conveniently fastened to each other by bolting. Bolting offers the advantage that the assembled base can be disassembled to repair or replace any of the laminar plates that had been worn or damaged in service. Other means of fastening the plates together, such as by surrounding the plates by a frame, and inserting a pair of wedges between the plates and the frame would suffice.

In the context of the present invention, a laminar base offers a convenient means for constructing a pocket having precise dimensions and accurately parallel sides therein. The portion of the base 20, shown in FIG. 1, that comprises pocket 40 illustrates this aspect of the invention. In order to accurately situate an insert 60 in the pocket 40, the sidewalls 44 are typically parallel to each other and separated by a precise distance that is slightly greater than the distance between the side surfaces 64 of the insert. Similarly, the slot 328 in the base is typically slightly greater in width than the thickness of the extraction/locking device 370, shown in FIG. 1. Thus, the portion of the base 20 that includes the pocket 40 can be made from five laminar plates, oriented in a vertical position, from the lower left to upper right portions of FIG. 1. The five plates are a first plate comprising the slot 328, second and third plates comprising the two sidewalls, and fourth and fifth plates spacing the slot from the adjacent sidewall. In this example, the first plate is ground to a specified thickness, and the contour of the cavity for receiving the extraction/locking device is machined away. The fourth and fifth plates are ground to their respective thicknesses. The second and third plates are also ground to their respective thicknesses. The five plates are then clamped together while alignment and bolting holes are drilled through all five plates. The first, fourth and fifth plates are temporarily aligned clamped together while the contour of the front and back walls, 47 and 45, respectively, the bottom 43, and the overhanging lip 46 and clearance recess 48 are machined. A wire EDM machining operation can provide the requisite precision in machining the contour of these surfaces, and ensuring that each of these surfaces is perpendicular to the surfaces of the plates. Any other machining process can be employed, although achieving the requisite precision can be more difficult. The five plates would then be semi-permanently fastened to each other.

An insert can also be fabricated from a series of distinct laminar plates. For example, insert 350, shown in FIGS. 9 and 10, can be made in a manner analogous to that just described for fabricating a base. It is also contemplated that an entire tooling apparatus, whether or not that tooling incorporates the modular concepts of the present invention, can be made from a series of distinct laminar plates. Circumstances that can favor tooling fabricated with laminar plates include a need for a precisely dimensioned cavity on a surface of the tooling, a need for precisely parallel surfaces on the tooling, or a need for disassembly of the tooling for repair.

The invention has been described and illustrated in terms of a base having a pocket, into which an insert having a cooperating lower portion is inserted. However, is contemplated in the present invention to associate the insert with the base by others means. In other embodiments of the invention, the attachment surface can comprise a raised surface on the base which can resemble the lower portion of an insert, such as lower portion 56 of insert 50 as described for and shown in FIG. 1. The raised surface of the base can be configured to associate with an insert comprising a correspondingly configured pocket, such as pocket 30 as described for and shown in FIG. 1.

EXAMPLE 1

A modular tooling apparatus comprising the extraction/locking device of the present invention was fabricated and prepared for operation in a factory environment. The apparatus was specifically designed to accommodate a family of compressor blades for a gas turbine engine. The manufacturing operation comprises trimming the ends of the airfoil sections of the blades in a milling operation. For each blade in the family, the dovetail section of the blade is secured in an dovetail insert having a workpiece support feature generally similar to that shown for insert 350 at the left side of FIG. 9. A toggle clamp provides a force A, shown in FIG. 10, along the y axis of the workpiece against the dovetail in the +y direction. The airfoil section of the blade is supported on a lower side by an insert having a workpiece support surface generally similar to that shown for insert 360 at the right side of FIG. 9, wherein the workpiece support surface is precisely machined to a contour that mates with the contour of the lower surface of the airfoil at its place of support. A third insert was provided to support the upper side of the airfoil of the opposed side from the second insert. A hydraulic cylinder affixed to the base his a pivoting arm having a pocket into which the third insert has been secured. The arm having the third pocket is similar to that shown for insert 750 shown in FIG. 9. The cylinder provides a downward force B onto the moveable third insert after positioning over the airfoil, to firmly secure the airfoil section from movement by pressing it against second insert. The combination and cooperation of the three inserts provide precise positioning and securement of the compressor blade during the end trim milling operation.

Technicians regularly employed in the metalworking arts were consistently able to change the dovetail insert within about 15 seconds. The configuration of the inserts for this particular family of components precluded convenient extraction from the pocket in the base of the tooling apparatus, except through use of the extraction feature of the present invention.

While specific embodiments of the apparatus of the present invention have been described, it will be apparent to those skilled in the metalworking arts that various modifications thereto can be made without departing from the spirit and scope of the present invention as defined in the appended claims.

We claim:

1. An improved modular tooling apparatus for performing a metalworking operation on a workpiece, wherein the apparatus comprises:
    (a) a base comprising an attachment surface, the attachment surface comprising a pocket and a locating feature;
    (b) a removable insert associated with the pocket, the insert comprising a locating feature and a workpiece support feature on a surface thereof; and
    (c) an extraction/locking device movable between a first position and a second position, the extraction/locking device comprising:
        (1) a means for pivoting the device between the first position wherein the insert is secured to the pocket, whereby the locating feature of the insert associates with the locating feature of the attachment surface to define a location of the workpiece support feature relative to the base, and the second position wherein the insert is at least partially extracted from the pocket;
        (2) a locking feature configured to engage the insert and secure it in the pocket whenever the extraction/locking device is pivoted to the first position; and
        (3) an extraction feature configured to at least partially extract the insert from the pocket whenever the extraction/locking device is pivoted away from the first position to the second position.

2. The modular tooling apparatus according to claim 1, wherein the extraction/locking device is movable between the first position and the second position without use of mechanic's tools.

3. The modular tooling apparatus according to claim 1, wherein:
    i. the pocket comprises a plurality of surfaces that collectively define the locating feature of the pocket;
    ii. the insert comprises an upper surface, and a lower portion that comprises a plurality of surfaces, at least two or which collectively define the locating point of the insert;
    iii. the insert is configured to slide smoothly into the pocket;
    iv. the locking feature of the extraction/locking device is configured to engage the upper surface of the insert when the extraction/locking device is disposed in its first position, thereby securing the insert in the pocket; and
    v. the extraction feature of the extraction/locking device is configured to press against a surface of the lower portion of the insert as the extraction/locking device is pivoted to its second position, thereby at least partially extracting the insert from the pocket.

4. The modular tooling apparatus according to claim 3, further comprising a detent means to urge the extraction/locking device to remain in its first position.

5. The modular tooling apparatus according to claim 3, wherein the insert further comprises a toe positioned adjacent to a first side of the lower portion opposite the upper surface of the insert, the toe comprising a restraining surface, and wherein the pocket further comprises an overhanging lip adjacent to and above a front surface of the pocket, configured to engage the restraining surface of the toe and to secure the first side of the insert into the pocket.

6. The modular tooling apparatus according to claim 1, wherein the pocket further comprises a pocket orientation feature so that the insert can be associated with pocket 30 in only one orientation.

7. An improved modular tooling apparatus for performing a metalworking operation on a workpiece, wherein the apparatus comprises:
    (a) a base configured for semi-permanent attachment to a table of a metalworking machine, the base comprising an attachment surface, the attachment surface comprising a locating feature;
    (b) a removable insert associated with the attachment surface by insertion, whereby the insert is unsecured by the attachment surface itself in only one direction from which the insert was associated with the pocket, the insert comprising a locating feature and a workpiece support feature on a surface thereof; and
    (c) an extraction/locking device comprising a first configuration wherein the insert is secured to the attachment surface, whereby the locating feature of the insert associates with the locating feature of the attachment surface to define a location of the workpiece support feature relative to the base, and a second configuration wherein the insert is at least partially extracted from the attachment surface.

8. The modular tooling apparatus according to claim 7 wherein the extraction/locking device is movable between the first configuration and the second configuration, and wherein the attachment surface comprises a pocket.

9. The modular tooling apparatus according to claim 8 wherein the extraction/locking device comprises:
    (a) a means for pivoting the device between a first position and a second position;
    (b) a locking feature configured to engage the insert and secure it in the pocket whenever the extraction/locking device is pivoted to the first position; and (c) an extraction feature configured to at least partially extract the insert from the pocket whenever the extraction/locking device is pivoted away from the first position to the second position.

10. The modular tooling apparatus according to claim 8, wherein the extraction/locking device is movable between the first configuration and the second configuration without use of mechanic's tools.

11. The modular tooling apparatus according to claim 9, wherein:

i. the pocket comprises a plurality of surfaces that collectively define the locating feature of the pocket;

ii. the insert comprises an upper surface, and a lower portion that comprises a plurality of surfaces, at least two of which collectively define the locating point of the insert;

iii. the insert is configured to slide smoothly into the pocket;

iv. the locking feature of the extraction/locking device is configured to engage the upper surface of the insert when the extraction/locking device is disposed in its first position, thereby securing the insert in the pocket; and v. the extraction feature of the extraction/locking device is configured to press against a surface of the lower portion of the insert as the extraction/locking device is pivoted to its second position, thereby at least partially extracting the insert from the pocket.

12. The modular tooling apparatus according to claim 11, further comprising a detent means to urge the extraction/locking device to remain in its first position.

13. The modular tooling apparatus according to claim 11, wherein the insert further comprises a toe positioned adjacent to a first side of the lower portion opposite the upper surface of the insert, the toe comprising a restraining surface, and wherein the pocket further comprises an overhanging lip adjacent to and above a front surface of the pocket, configured to engage the restraining surface of the toe and to secure the first side of the insert into the pocket.

14. The modular tooling apparatus according to claim 8, wherein the pocket further comprises a pocket orientation feature so that the insert can be associated with pocket 30 in only one orientation.

* * * * *